United States Patent
Takamura et al.

(10) Patent No.: US 7,097,672 B2
(45) Date of Patent: Aug. 29, 2006

(54) METAL SEPARATOR FOR FUEL CELL AND BONDING METHOD THERE OF

(75) Inventors: Tomoyuki Takamura, Toyota (JP); Masanao Shiomi, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 404 days.

(21) Appl. No.: 10/620,790

(22) Filed: Jul. 15, 2003

(65) Prior Publication Data

US 2004/0013931 A1    Jan. 22, 2004

(30) Foreign Application Priority Data

Jul. 18, 2002   (JP) .............................. 2002-209202

(51) Int. Cl.
 *H01M 6/00*     (2006.01)
 *H01M 2/08*     (2006.01)
(52) U.S. Cl. ...................................... 29/623.4; 429/36
(58) Field of Classification Search ................ 429/36; 156/221, 252, 256, 226; 29/623.4
See application file for complete search history.

(56) References Cited

U.S. PATENT DOCUMENTS 6,528,176 B1 *  3/2003  Asai et al. ................. 428/582

FOREIGN PATENT DOCUMENTS

| EP | 0 978 891 | 2/2000 |
|---|---|---|
| EP | 1 061 598 | 12/2000 |
| JP | 06/036781 | 2/1994 |
| JP | 09-115530 | 5/1997 |
| JP | 10-15651 A | 6/1998 |
| JP | 11-239834 A | 9/1999 |
| JP | 2000-225424 A | 8/2000 |
| WO | WO 99/54131 | 10/1999 |

* cited by examiner

*Primary Examiner*—Patrick Joseph Ryan
*Assistant Examiner*—Thomas H. Parsons
(74) *Attorney, Agent, or Firm*—Fish & Richardson P.C.

(57) ABSTRACT

A metal separator 10 for a fuel cell is configured such that, after forming through-holes 11*b* and 12*b* on a first separator member 11 and a second separator member 12, rising wall sections 11*c* and 12*c* are provided so as to be spaced apart from formed sections 11*a* and 12*a* for introducing a gas by a predetermined distance L, the rising wall section 11*c* of the first separator member 11 is fittingly inserted into the rising wall section 12*c* of the second separator member 12 for performing a positional alignment therebeween, and then, the rising wall sections 11*c* and 12*c* are folded to be caulked, whereby the first separator member 11 and the second separator member 12 are bonded to each other. A positional alignment between the first separator member 11 and the second separator member 12 become facilitative.

11 Claims, 10 Drawing Sheets

METAL SEPARATOR FOR FUEL CELL AND BONDING METHOD THERE OF

BACKGROUND OF THE INVENTION

1. Field of the Invention

The present invention relates to a metal separator for a fuel cell and a bonding method there of.

2. Description of the Prior Arts

Recently, a metallic separator has been developed in addition to a carbonate one as a separator for a fuel cell. The metallic separator has low-thermal capacity to thereby be capable of rapidly raising a temperature in a fuel cell stack to a suitable temperature upon its starting-up. The metallic separator is comprised of two plate-like separator members bonded to each other via an electrolyte film, an anode electrode and a cathode electrode to form introducing sections of hydrogen gas and oxidant gas. A plurality of spaces formed between a pair of the metallic separators are used as cooling water paths for cooling the fuel cell stack.

There are several types of methods for bonding two plate-like members, among which a method using a binder, a method by a brazing and a method utilizing a diffusion of a metallic material are mainly adopted. Incidentally, the electric power generation efficiency of the fuel cell is reduced when there is a deviation between the introducing sections of hydrogen gas and oxidant gas. Therefore, the deviation amount between two separator members is strictly placed to an amount not more than a predetermined amount upon bonding two separator members to each other. However, in any one of the above-mentioned methods, both of two separator members have to be left to stand for a long period with both of them brought into intimate contact upon bonding two separator members to each other, resulting in involving difficulty to perform a positional alignment for preventing the deviation between them. Therefore, a positioning member or the like is required to be provided upon bonding the separators.

Further, the method for bonding with a binder performs a positional alignment between two separators having the binder applied thereon, and requires to leave two separators for several hours that are brought into intimate contact with each other for curing the binder, thus causing poor productivity. Moreover, it is necessary to select a binder tolerable to a tough temperature condition, since the fuel cell stack is under a high temperature. Additionally, the method by a brazing and the method utilizing a diffusion of the metallic material makes a production in a lot, thereby causing poor productivity and moreover, being likely to cause a separation, deviation, falling or the like at the bonding section by the deformation of the separator due to the temperature change of the fuel cell stack.

SUMMARY OF THE INVENTION

The present invention eliminates the above-mentioned conventional subjects, and aims to provide a metal separator for a fuel cell that can provide an easy positional alignment of two separators and has good productivity.

The first invention of the present invention provides a metal separator for a fuel cell wherein a first separator member made of a metal and a second separator member made of a metal are caulked to be bonded to each other.

The configuration of the first invention wherein the first separator member and second separator member are caulked to be bonded to each other eliminates a need of a long-time intimate contact between them, thereby providing a metal separator for a fuel cell with a good productivity that can facilitate a positional alignment between them and can be adapted to an assembly line.

The second invention of the present invention provides a metal separator for a fuel cell provided with a first separator member having a rising wall section formed to be spaced apart from a formed section for introducing a gas by a predetermined distance and a second separator member having a rising wall section formed to be spaced apart from a formed section for introducing a gas by the predetermined distance, wherein the rising wall section of the first separator member is fittingly inserted into the rising wall section of the second separator member, whereupon the rising wall section of the first separator member and the rising wall section of the second separator member are folded to be caulked, thereby being bonded to each other.

A metal separator for a fuel cell with a good productivity that can facilitate a positional alignment between them and can be adapted to an assembly line can be provided by the configuration of the second invention wherein the rising wall section of the first separator member is fittingly inserted into the rising wall section of the second separator member, whereupon the rising wall section of the first separator member and the rising wall section of the second separator member are folded to be caulked, thereby being bonded to each other.

A first detailed configuration of the present invention provides a metal separator for a fuel cell disclosed in the second invention, wherein a bonding section where the first separator member and the second separator member are bonded to each other serves as a manifold for passing a gas.

The first detailed configuration of the invention wherein a bonding section where the first separator member and the second separator member are bonded to each other serves as a manifold for passing a gas can facilitate a positional alignment between the first separator member and the second separator member without specially providing a section for positioning the first separator member and the second separator member.

A second detailed configuration of the present invention provides a metal separator for a fuel cell disclosed in the second invention, wherein a bonding section where the first separator member and the second separator member are bonded to each other is configured such that a leading edge of the first separator member is brought into contact with the second separator member for covering a folding section of the second separator member with a folding section of the first separator member.

The second detailed configuration of the present invention wherein a bonding section where the first separator member and the second separator member are bonded to each other is configured such that a leading edge of the first separator member is brought into contact with the second separator member for covering a folding section of the second separator member with a folding section of the first separator member increases a folding amount at the folding section of the first separator member to cause a plastic deformation. Therefore, a spring back at the folding section of the first separator member is prevented to enhance sealability to a gas at the bonding section.

A further detailed configuration in the second detailed configuration of the present invention provides a metal separator for a fuel cell disclosed in the second invention, wherein a sealant is incorporated into a space formed between the second separator member and the folding section of the first separator member.

The further detailed configuration in the second detailed configuration of the present invention wherein a sealant is incorporated into a space formed between the second separator member and the folding section of the first separator member can further enhance sealability to a gas at the bonding section.

An another further detailed configuration in the second detailed configuration of the present invention provides a metal separator for a fuel cell disclosed in the second invention, wherein a step section is provided at the bonding section of the first separator member and the second separator member.

The another further detailed configuration in the second detailed configuration of the present invention wherein a step section is provided at the bonding section of the first separator member and the second separator member causes a plastic deformation of the first separator member and the second separator member to thereby increase adhesiveness between the first separator member and the second separator member. Therefore, sealability to a gas at the bonding section can further be enhanced.

A third detailed configuration of the present invention provides a metal separator for a fuel cell disclosed in the second invention, wherein, at the bonding section of the first separator member and the second separator member, a plate thickness of the first separator member or the second separator member at the bonding section is decreased by a fixed and intimate contact between the first separator member and the second separator member.

Sealability to a gas at the bonding section can be enhanced by the third detailed configuration of the invention wherein, at the bonding section of the first separator member and the second separator member, a plate thickness of the first separator member or the second separator member at the bonding section is decreased by a fixed and intimate contact between the first separator member and the second separator member.

DESCRIPTION OF THE PREFERRED EMBODIMENT

Figure 1A:
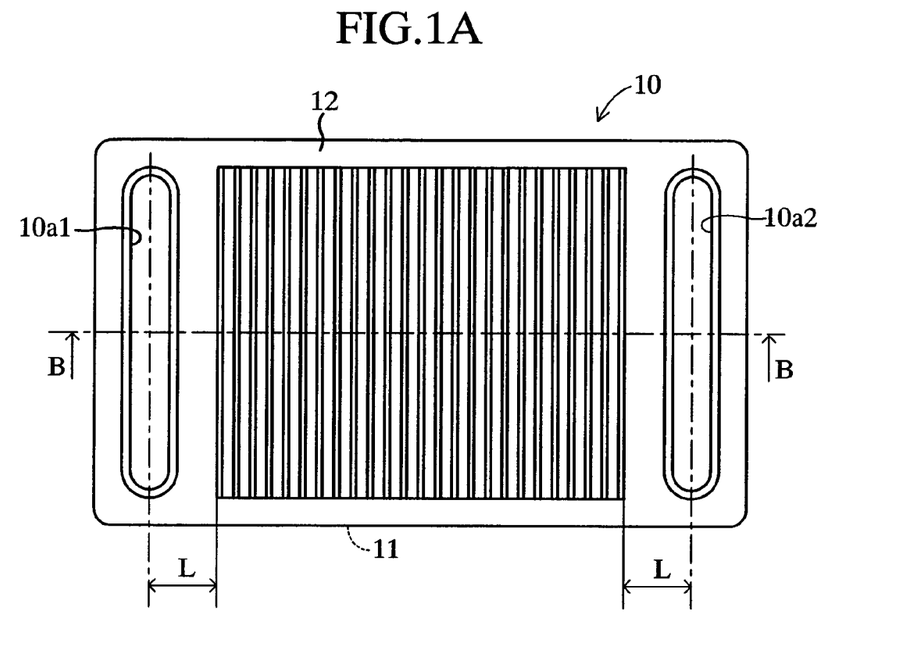
FIG. 1A is a plan view of a metal separator for a fuel cell according to the present invention.
Figure 1B:
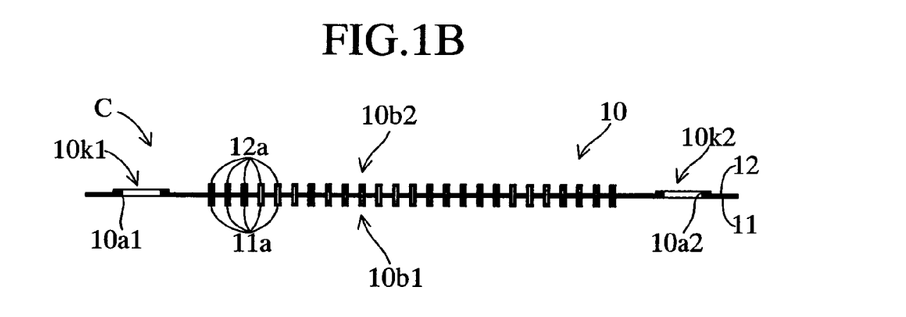
FIG. 1B is a sectional view taken along a line B—B of FIG. 1A.
Figure 1C:
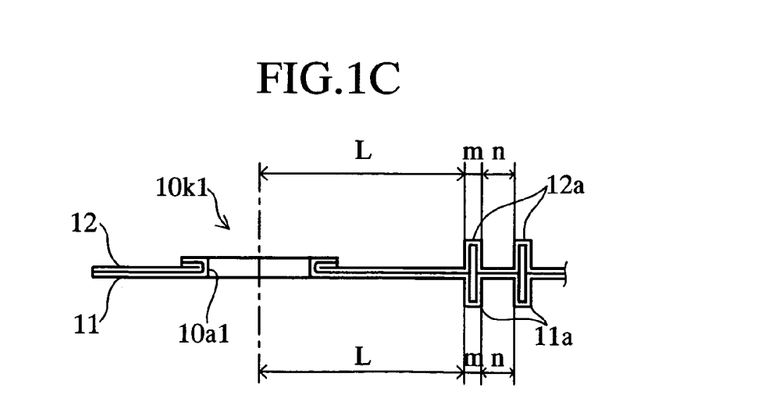
FIG. 1C is a detailed view of a C section in FIG. 1B.

FIG. 1A is a plan view of a metal separator 10 for a fuel cell of the present invention, FIG. 1B is a sectional view taken along a line B—B of FIG. 1A and FIG. 1C is a view showing in detail a C section of FIG. 1B. As shown in the figures, the metal separator 10 for a fuel cell is configured such that a first separator member 11 made of a metallic material such as a stainless or the like having a thickness of zero point several millimeters and a second separator member 12 made similarly of a metallic material such as a stainless or the like having a thickness of zero point several millimeters are bonded to each other.

The metal separator 10 is provided at both of left and right sides in FIG. 1A with two manifolds $10a1$ and $10a2$ that are through-holes for passing a gas from an external side of a fuel cell stack not shown and introducing the same gas into the fuel cell stack. Provided between two manifolds $10a1$ and $10a2$ are gas introducing sections $10b1$ and $10b2$ for introducing a gas at both surfaces to cause a chemical reaction.

The first separator member 11 and the second separator member 12 are caulked to be bonded to each other at two bonding sections $10k1$ and $10k2$ of the metal separator 10 for a fuel cell. The manifolds $10a1$ and $10a2$ are formed by caulking the first separator member 11 and the second separator member 12 at the bonding sections $10k1$ and $10k2$.

The first separator member 11 and the second separator member 12 each has a plurality of formed sections (drawing sections) $11a$ and $12a$ (several formed sections are only represented by numerals respectively) formed between the manifolds $10a1$ and $10a2$ so as to compose the above-mentioned gas introducing sections $10b1$ and $10b2$ of the metal separator 10 for a fuel cell. The formed sections 11a and 12a form a cooling chamber by the bonding of the first separator member 11 and the second separator member 12, and are utilized for causing a chemical reaction for an electric power generation by introducing a gas (described later).

Figure 10:
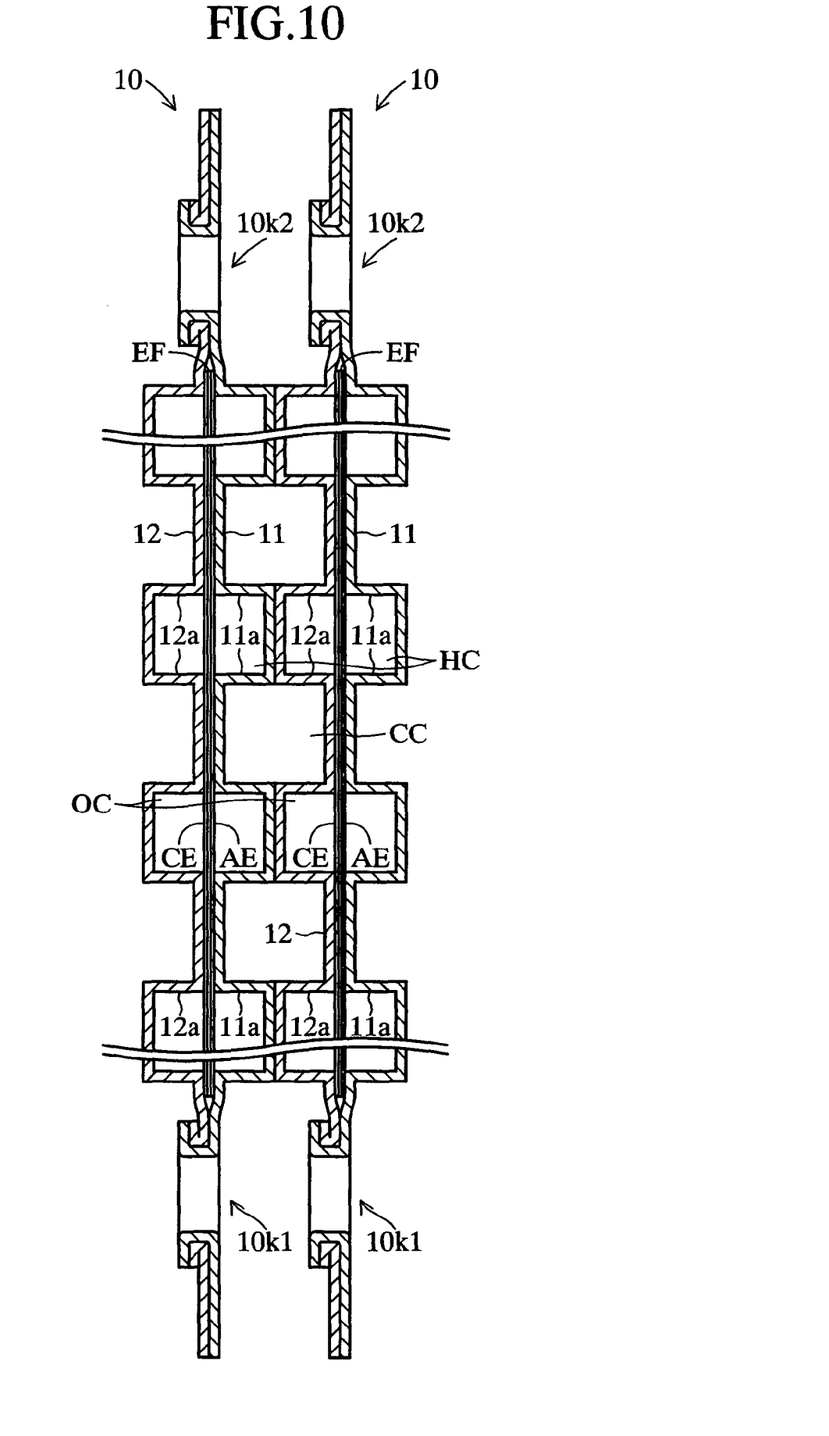
FIG. 10 is a partial sectional view of an inside of a fuel cell stack when the metal separator for a fuel cell is applied thereto.

FIG. 10 is a partial sectional view of an inside of a fuel cell stack when the metal separator 10 for a fuel cell is adapted thereto. The figure shows only two metal separators 10 by omitting separators which are originally bonded to the first separator member 11 and the second separator member 12 of the two separators 10. Arranged between two metal separators 10 for a fuel cell is an electrolyte film EF via an anode electrode AE and a cathode electrode CE.

Formed by the formed section 11a between the first separator member 11 of the metal separator 10 for a fuel cell and the anode electrode AE are a plurality of fuel gas channels HC to which a fuel gas containing hydrogen is introduced via the manifold 10a1 or 10a2, while formed by the formed section 12a between the second separator member 12 of the metal separator 10 for a fuel cell and the cathode electrode CE are a plurality of oxidant gas channels OC to which a gas containing oxygen is introduced via the manifold 10a1 or 10a2. The chemical reaction occurs between the fuel gas channel HC and the oxidant gas channel OC arranged via the electrolyte film EF, thereby causing an electrical power generation.

A cooling chamber CC into which cooling water that is a cooling medium for cooling the fuel cell stack is circulated is arranged between the adjacent first separator member 11 and the second separator member 12. It is needless to say that the following configuration may be adopted instead of the above-mentioned configuration such that the second separator member 12 is arranged to be in contact with the anode electrode AE, a plurality of fuel gas channels HC are arranged between the second separator member 12 and the anode electrode AD, the first separator member 11 is arranged to be in contact with the cathode electrode CE and a plurality of oxidant gas channels OC are arranged between the first separator member 11 and the cathode electrode CE.

It is important for the metal separator 10 for a fuel cell for improving the electric power generation efficiency that the fuel gas channels HC and the oxidant gas channels OC opposite to each other via the electrolyte film EF are not deviated from each other, i.e., there is no deviation between each of the opposing formed sections 11a and 12a composing the gas introducing sections 10b1 and 10b2 of the first separator member 11 and the second separator member 12.

The respective positions of the first separator member 11 and the second separator member 12 are determined by the bonding sections 10k1 and 10k2. Accordingly, the formed sections 11a and 12a that are the nearest to the bonding section 10k1 or 10k2 of the first separator member 11 and the second separator member 12 are arranged respectively to have a distance to the center of the bonding sections 10k1 and 10k2 equal to L as shown in FIG. 1C. Further, each of the formed sections 11a and 12a is set to have a width equal to m and a distance between the formed sections 11a and 12a equal to n. Although FIG. 1C only represents the side of the bonding section 10k1, a similar description is adopted to the side of the bonding section 10k2.

Subsequently explained with reference to FIG. 2A to FIG. 7B is a method for bonding the first separator member 11 provided with the formed section 11a and the second separator member 12 provided with the formed section 12a of the metal separator 10 for a fuel cell according to the invention. FIG. 2A to FIG. 7B each represents a section corresponding to FIG. 1C. Although FIG. 2A to FIG. 7B only represent the side of the bonding section 10k1 of the first separator member 11 or the second separator member 12 like FIG. 1C, the configuration same as that shown in FIG. 2A to FIG. 7B is provided at the side of the bonding section 10k2.

Figure 2A:
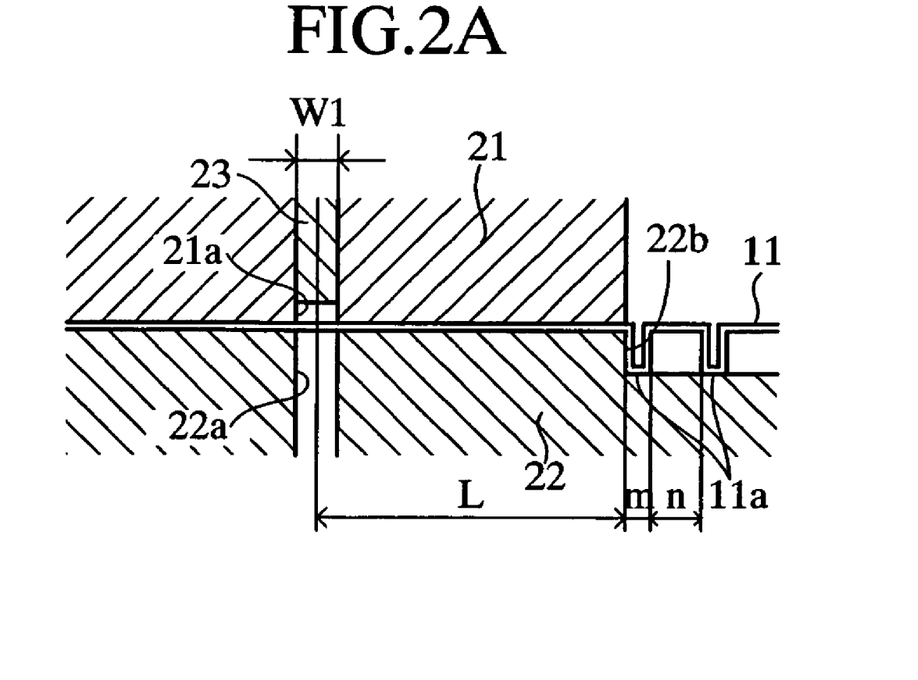
FIG. 2A is a view showing a state wherein a first separator member is clamped before being bored.
Figure 2B:
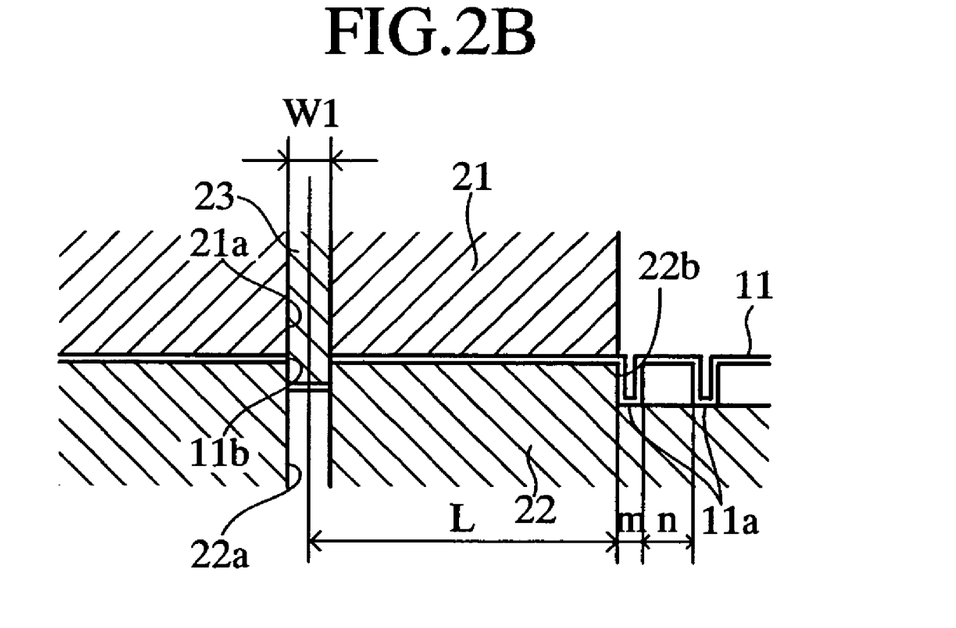
FIG. 2B is a view showing a state wherein the first separator member is bored.

FIG. 2A and FIG. 2B show a process for forming a through-hole 11b at the first separator member 11. In FIG. 2A, the first separator member 11 is nipped (clamped) between a stripper 21 for punching a prepared hole and a die 22 for punching a prepared hole with the formed section 11a projecting downwardly. The stripper 21 and the die 22 are respectively provided with punch holes 21a and 22a. As shown in FIG. 2A, arranged in the punch hole 21a is a punch 23 for punching a prepared hole that is movable in the punch holes 21a and 22a and has a sectional form approximately similar in shape to the through-hole of the manifold 10a1 shown in FIG. 1A. A drive unit not shown is connected to the punch 23. The punch 23 has a width W1 in its section shown in FIG. 2A and FIG. 2B.

Provided at the die 22 is a step section 22b that is set to have a predetermined distance L from the center of the punch hole 22a. As shown in FIG. 2A, the side face of the outermost formed section 11a is brought into contact with the step section 22b, whereby a positional alignment of the first separator member 11 is performed.

Subsequently, the first separator member 11 clamped by the stripper 21 and the die 22 is bored, as shown in FIG. 2B, by the punch 23 that moves downwardly in the punch hole 22a by the operation of the driving unit connected to the punch 23, thereby forming the through-hole 11b having the width of W1. It is to be noted that each of the plurality of formed sections 11a is set to have the predetermined width m and the predetermined distance n between the adjacent formed sections as described above (one width m and one distance n are shown in FIG. 2A and FIG. 2B).

Figure 3A:
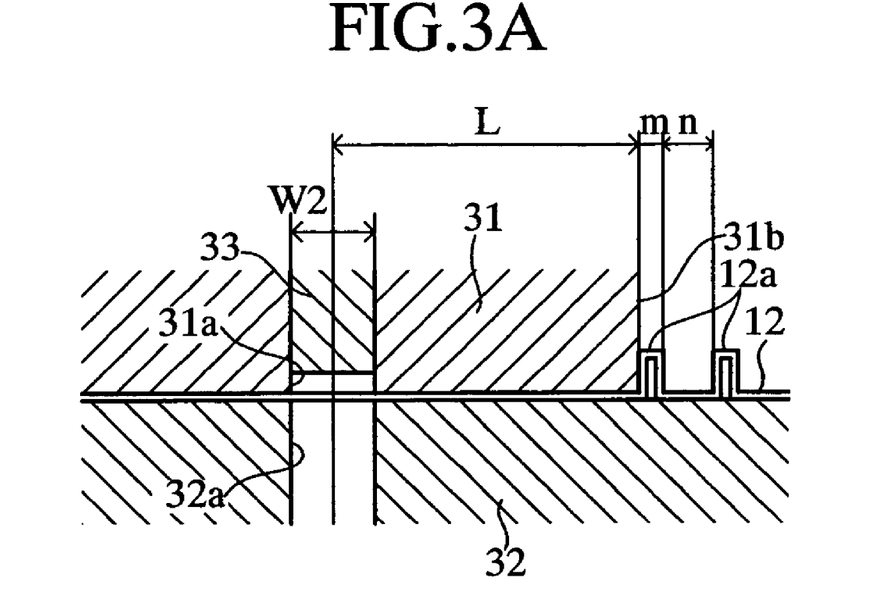
FIG. 3A is a view showing a state wherein a second separator member is clamped before being bored.
Figure 3B:
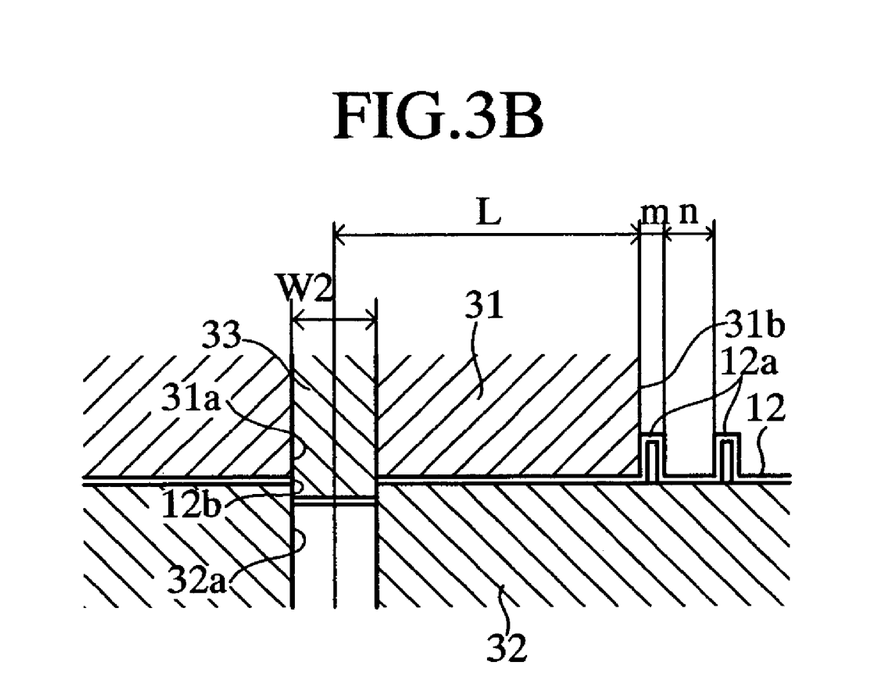
FIG. 3B is a view showing a state wherein the second separator member is bored.

On the other hand, FIG. 3A and FIG. 3B are a view for showing a process for forming a through-hole 12b at the second separator member 12. In FIG. 3A, the second separator member 12 is, like the first separator member 11, nipped (clamped) between a stripper 31 for punching a prepared hole and a die 32 for punching a prepared hole with the formed section 12a projecting upwardly. The stripper 31 and the die 32 are respectively provided with punch holes 31a and 32a. As shown in FIG. 3A, arranged in the punch hole 31a is a punch 33 for punching a prepared hole that is movable in the punch holes 31a and 32a and has a sectional form approximately similar in shape to the through-hole of the manifold 10a1 shown in FIG. 1A. The punch 33 has a width W2 that is greater than the width W1 in its section shown in FIG. 3A and FIG. 3B.

Provided at the stripper 31 is a side face section 31b that is also set to have the predetermined distance L from the center of the punch hole 32a. As shown in FIG. 3A, the side face of the outermost formed section 12a is brought into contact with the side face section 31b, whereby a positional alignment of the second separator member 12 is performed.

Subsequently, the second separator member 12 clamped by the stripper 31 and the die 32 is bored, as shown in FIG. 3B, by the punch 23 that moves downwardly in the punch hole 31a, thereby forming the through-hole 12b having the width of W2. It is to be noted that each of the plurality of formed sections 12a is also set to have the predetermined width m and the predetermined distance n between the adjacent formed sections as described above (one width m and one distance n are shown in FIG. 3A and FIG. 3B).

Figure 4A:
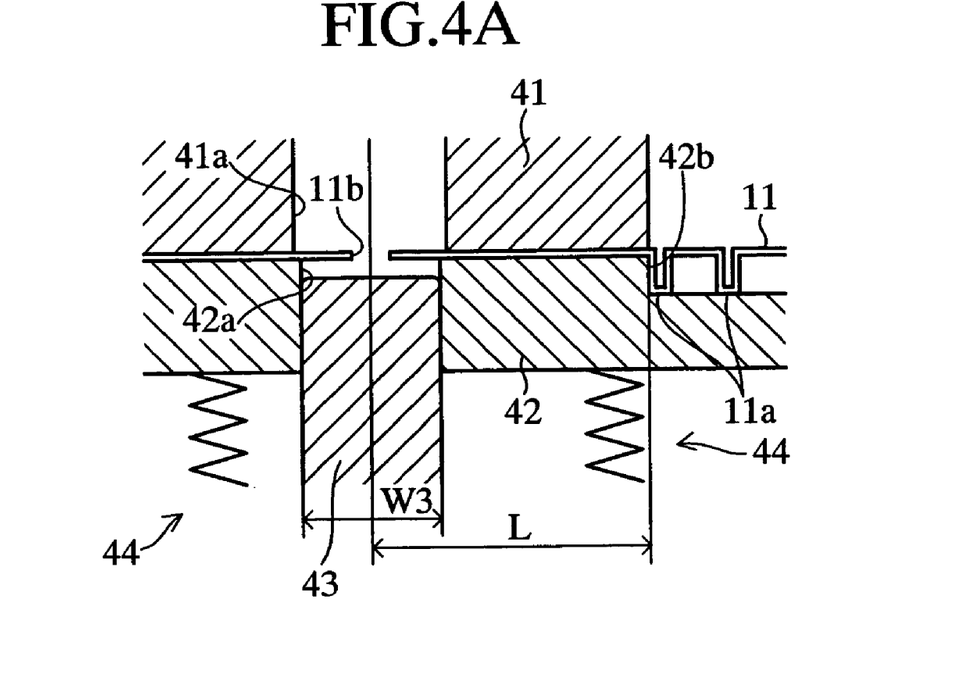
FIG. 4A is a view showing a state wherein the first separator member is clamped before being burring-processed.
Figure 4B:
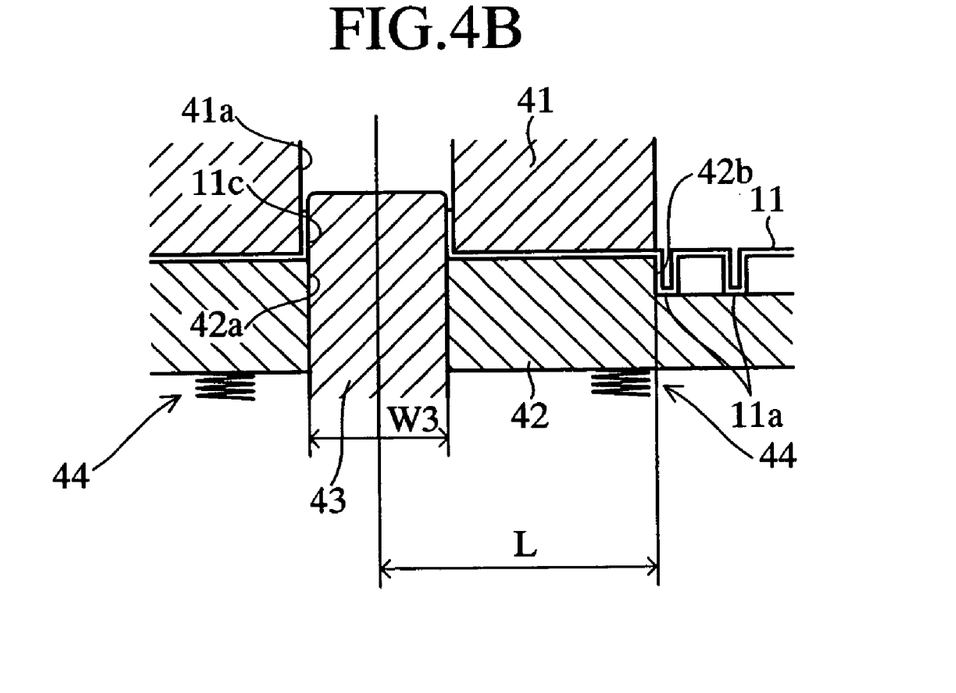
FIG. 4B is a view showing a state wherein the first separator member is burring-processed.

Subsequently, FIG. 4A and FIG. 4B are a view for showing a process (burring process) for forming a rising wall section 11c at the first separator member 11. As shown in FIG. 4A, the bored first separator member 11 is nipped (clamped) between a burring upper die 41 and a burring lower die 42 with the formed section 11a projecting downwardly. The burring upper die 41 is connected to a driving unit not shown. Further, the bottom surface of the burring lower die 42 is connected to a top end of each of a plurality of compression springs 44 (only two of them are represented in FIG. 4A and FIG. 4B), while the bottom end thereof is connected to a fixing member not shown. A spring force of the compression spring 44 presses the upper surface of the burring lower die 42 toward the bottom surface of the first separator member 11 at all times.

The burring upper die 41 and the burring lower die 42 are respectively provided with holes 41a and 42a for a bending edge. As shown in FIG. 4A, arranged in the hole 42a is a bending edge 43 for the lower die that is movable in the holes 42a and 41a and has a sectional form approximately similar in shape to the through-hole of the manifold 10a1 shown in FIG. 1A. The bending edge 43 is fixed to a fixing member not shown. The bending edge 43 has a width W3 in its section shown in FIG. 4A and FIG. 4B.

Provided at the burring lower die 42 is a step section 42b that is set to have the predetermined distance L from the center of the hole 42a. As shown in FIG. 4A, the side face of the formed section 11a that is the nearest to the through-hole 11b is brought into contact with the step section 42b, whereby a positional alignment of the first separator member 11 is performed.

Subsequently, the first separator member 11 clamped by the burring upper die 41 and the burring lower die 42 is, as shown in FIG. 4B, moved downward integrally with the burring upper die 41 and the burring lower die 42 with the compression spring 44 being bent by the operation of the driving unit connected to the burring upper die 41. Therefore, the vicinity of the through-hole 11b of the first separator member 11 is bent by the upper end surface of the bending edge 43 due to the downward movement, thereby forming the rising wall section 11c having its center located at the position having the distance L from the formed section 11a that is the nearest to the through-hole 11b (also shown in the middle stage in FIG. 8).

Figure 5A:
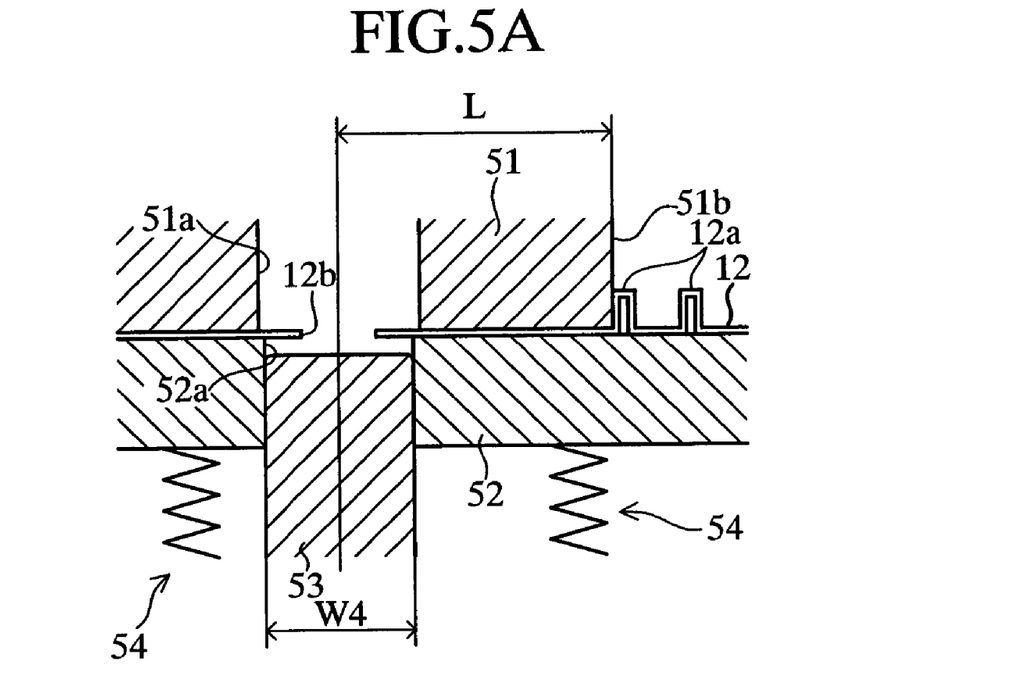
FIG. 5A is a view showing a state wherein the second separator member is clamped before being burring-processed.
Figure 5B:
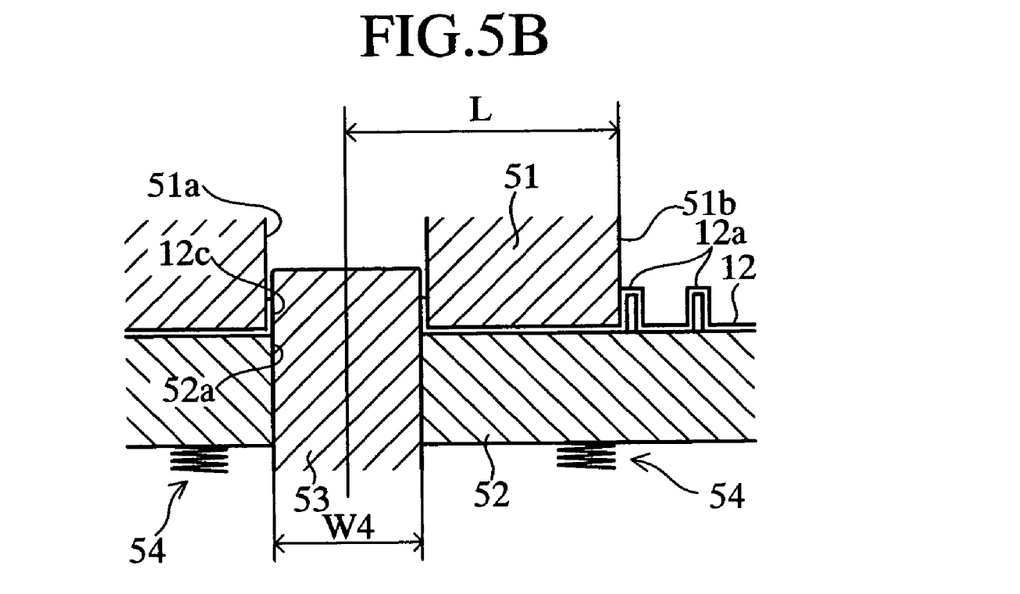
FIG. 5B is a view showing a state wherein the second separator member is burring-processed.

On the other hand, FIG. 5A and FIG. 5B is a view showing a process (burring process) for forming a rising wall section 12c at the second separator member 12. As shown in FIG. 5A, the bored second separator member 12, is like the first separator member 11, nipped (clamped) between a burring upper die 51 and a burring lower die 52 with the formed section 12a projecting upwardly. The burring upper die 51 is connected to a driving unit not shown.

Further, the bottom surface of the burring lower die 52 is connected to a top end of each of a plurality of compression springs 54 (only two of them are represented in FIG. 5A and FIG. 5B), while the bottom end thereof is connected to a fixing member not shown. A spring force of the compression spring 54 presses the upper surface of the burring lower die 52 toward the bottom surface of the second separator member 12 at all times. It is to be noted that the compression springs 44 and 54 can be replaced with a gas spring, urethane spring or hydraulic cushion.

The burring upper die 51 and the burring lower die 52 are respectively provided with holes 51a and 52a for a bending edge. As shown in FIG. 5A, arranged in the hole 52a is a bending edge 53 for the burring lower die that is movable in the holes 52a and 51a and has a sectional form approximately similar in shape to the through-hole of the manifold 10a1 shown in FIG. 1A. The bending edge 53 is fixed to a fixing member not shown. The bending edge 53 has a width W4 that is greater than the above-mentioned width W3 in its section shown in FIG. 5A and FIG. 5B.

Provided at the burring lower die 52 is a side face section 51b that is set to have the predetermined distance L from the center of the hole 52a. As shown in FIG. 5A, the side face of the formed section 12a that is the nearest to the through-hole 12b is brought into contact with the side face section 51b, whereby a positional alignment of the second separator member 12 is performed.

Subsequently, the second separator member 12 clamped by the burring upper die 51 and the burring lower die 52 is, as shown in FIG. 5B, moved downward integrally with the burring upper die 51 and the burring lower die 52 with the compression spring 54 being bent by the operation of the driving unit connected to the burring upper die 51. Therefore, the vicinity of the through-hole 12b of the second separator member 12 is bent by the upper end surface of the bending edge 53 due to the downward movement, thereby forming the rising wall section 12c having a size such that the rising wall section 11c of the first separator member 11 can be inserted thereto and having its center located at the position having the distance L from the formed section 12a that is the nearest to the through-hole 12b (also shown in the upper stage in FIG. 8).

Figure 6A:
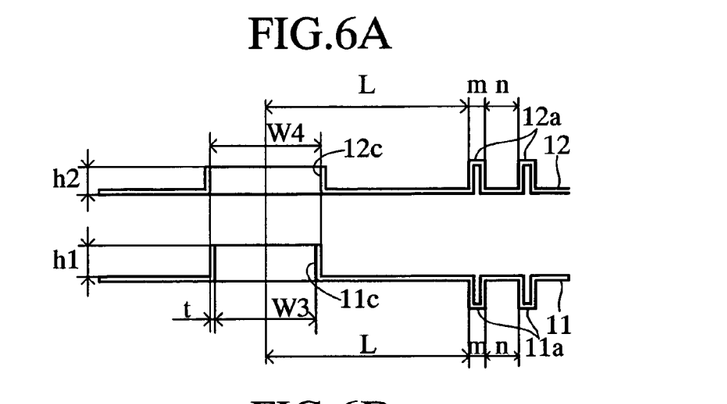
FIG. 6A is a view showing a state of the first separator member and second separator member before a positional alignment.
Figure 6B:
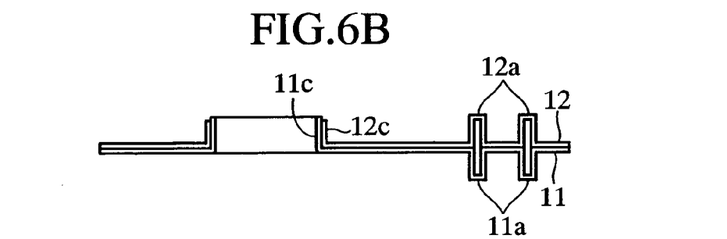
FIG. 6B is a view showing a state wherein a rising wall section of the first separator member is fittingly inserted into a rising wall section of the second separator member.
Figure 8:
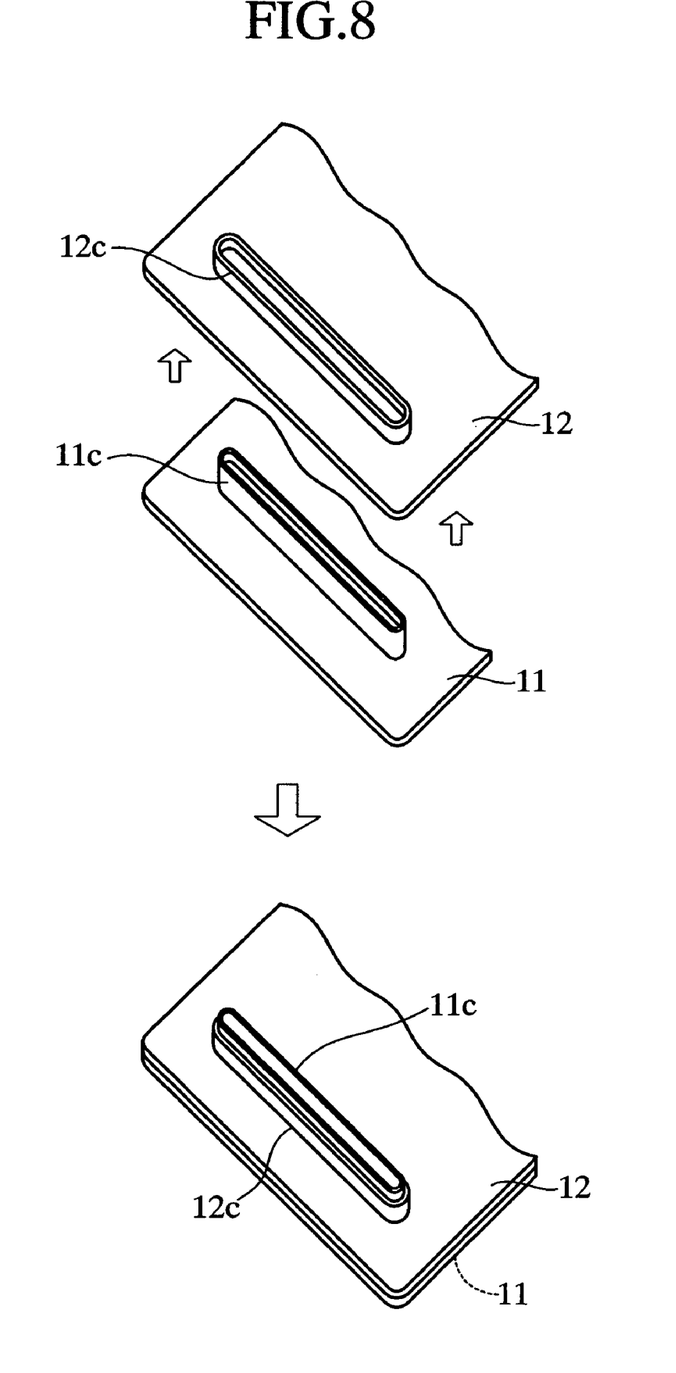
FIG. 8 is a perspective view for explaining a state wherein the rising wall sections of the first and second separator members are fittingly engaged to each other.

Subsequently, FIG. 6A to FIG. 6D are a view showing a process for temporarily bending the rising wall section 11c of the first separator member 11 and the rising wall section 12c of the second separator member 12 after performing the positional alignment between the first separator member 11 and the second separator member 12. Firstly, as shown in FIGS. 6A, 6B and 8, the first separator member 11 and the second separator member 12 are positioned, and then, the rising wall section 11c of the first separator member 11 is fittingly inserted into the rising wall section 12c of the second separator member 12 (shown in the bottom stage in FIG. 8). As shown in FIG. 6A, the inner width W3 of the rising wall section 11c of the first separator member 11 and the inner width W4 of the rising wall section 12c of the second separator member 12 are set such that the width W4 is slightly greater than the width of W3+2t assuming that the plate thickness of the first separator member 11 is defined as t.

The same dimensional relationship is applied to longitudinal directions of the rising wall sections 11c and 12c not shown in FIG. 6A to FIG. 6D (longitudinal directions of the manifolds 10a1 and 10a2 shown in FIG. 1A) (i.e., the internal circumference of the rising wall section 11c is similar in shape to the internal circumference of the rising wall section 12c but is smaller than that by approximately 2t in the horizontal direction of the first separator member 11 all over its circumference). As a result, the rising wall section 11c of the first separator member 11 can be fittingly inserted into the rising wall section 12c of the second separator member 12 without any shaky movement as shown in FIGS. 6A, 6B and 8.

As described above, the distance between the center of the rising wall section 11c and the formed section 11a that is the nearest to the rising wall section 11c and the distance between the center of the rising wall section 12c and the formed section 12a that is the nearest to the rising wall section 12c are set to L, and the other formed sections 11a and 12a are formed to have the predetermined width m and predetermined space n. Therefore, the positional alignment between the formed section 12a of the second separator member 12 and the opposite formed section 11a of the first separator member 11 can easily be performed only by fittingly inserting the rising wall section 11c of the first separator member 11 into the rising wall section 12c of the second separator member 12. It is to be noted that, as shown in FIG. 6A, a height h1 of the rising wall section 11c from the top surface of the first separator member 11 is set slightly greater than a height h2 of the rising wall section 12c from the bottom surface of the second separator member 12.

Figure 6C:
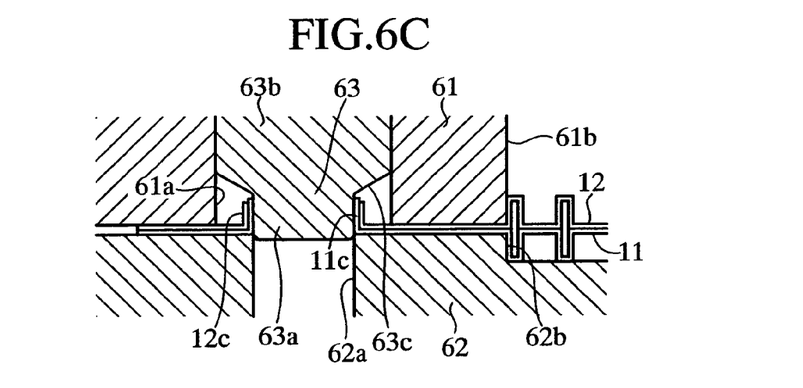
FIG. 6C is a view showing a state wherein the rising wall sections of the first and second separator members are clamped before being temporarily bent.

Subsequently, the first separator member 11 and the second separator member 12 that have been subject to the positional alignment by the rising wall sections 11c and 12c are nipped (clamped) between a stripper 61 for caulking and a die 62 for caulking as shown in FIG. 6C. The stripper 61 and die 62 are respectively provided with holes 61a and 62a for caulking. As shown in FIG. 6C, a punch 63 for temporary bending is arranged in the hole 61a so as to be movable in the holes 61a and 62a.

A driving unit not shown is connected to the punch 63. The punch 63 has a guide section 63a that is fitted to the hole 62a, a shaft section 63b having a sectional form greater than the guide section 63a fitted to the hole 61a in FIG. 6A to FIG. 6D and a slope section 63c that connects the guide section 63a and the shaft section 63b. The guide section 63a has a sectional form approximately similar to the shape of the through-hole of the manifold 10al shown in FIG. 1A and fittingly inserted into the inside of the rising wall section 11c of the first separator member 11 as shown in the figure.

The die 62 is provided with a step section 62b. Similarly, the stripper 61 is provided with a side face section 61b. The formed section 11a of the first separator member 11 and the formed section 12a of the second separator member 12 that are the nearest to the rising wall section 11c or 12c are respectively brought into contact with the step section 62b of the die 62 and the side face section 61b of the stripper 61.

Figure 6D:
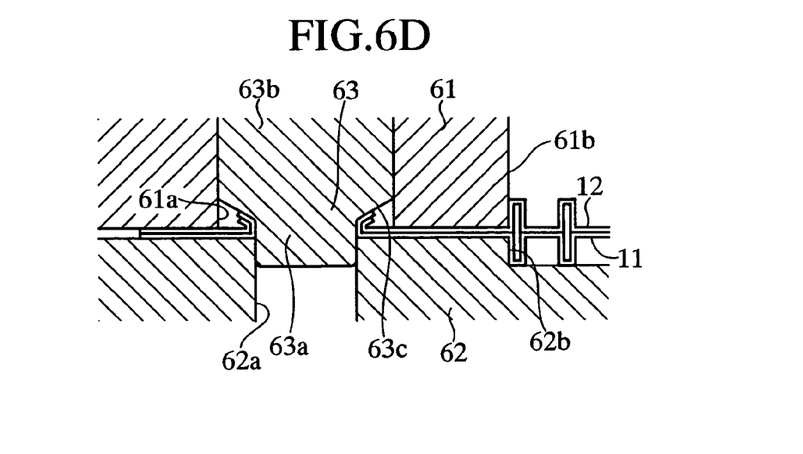
FIG. 6D is a view showing a state wherein the rising wall sections of the first and second separator members are temporarily bent.

Subsequently, the punch 63 is moved downward in the holes 61a and 62b by the operation of the driving unit connected to the punch 63, whereby the first separator member 11 and the second separator member 12 clamped by the stripper 61 and the die 62 are shaped such that, as shown in FIG. 6D, the rising wall sections 11c and 12c of the first separator member 11 and the second separator member 12 are folded and temporarily bent by an angle of approximately 45 degrees by the slope section 63c of the punch 63.

Figure 7A:
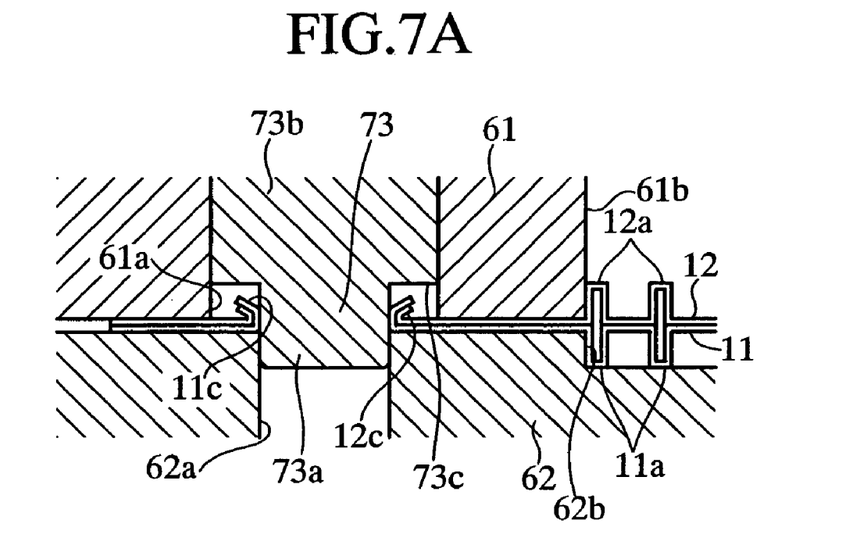
FIG. 7A is a view showing a state of the first separator member and second separator member before being hemming-processed.
Figure 7B:
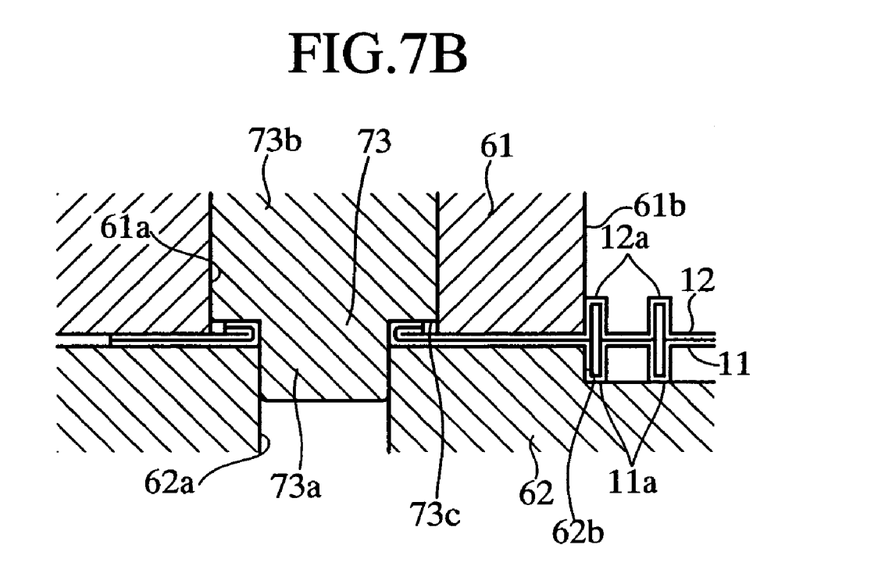
FIG. 7B is a view showing a state wherein the first and second separator members are hemming-processed.

Finally, FIG. 7A and FIG. 7B are a view showing a process (hemming process) for caulking the rising wall section 11c of the first separator member 11 and the rising wall section 12c of the second separator member 12, both of which has been temporarily bent. As shown in FIG. 7A, the first separator member 11 and the second separator member 12 are clamped by the stripper 61 and the die 62 shown in FIG. 6A to FIG. 6D. A punch 73 for caulking is fittingly arranged so as to be movable in the holes 61a and 62a of the stripper 61 and the die 62.

A driving unit not shown is connected to the punch 73. The punch 73 has a guide section 73a that is fitted to the hole 62a, a shaft section 73b having a sectional form greater than the guide section 73a fitted to the hole 61a in FIG. 7A and FIG. 7B and a shoulder section 73c that connects the guide section 73a and the shaft section 73b. The guide section 73a has a sectional form approximately similar to the shape of the through-hole of the manifold 10al shown in FIG. 1A.

Subsequently, the punch 73 is moved downward in the holes 61a and 62a by the operation of the driving unit connected to the punch 73, whereby the sloped rising wall sections 11c and 12c of the first separator member 11 and the second separator member 12 are strongly and nippingly pressed in the vertical direction in the figure by the shoulder section 73c of the punch 73 and the upper surface of the die 62 (hemming process).

The height h1 of the rising wall section 11c from the upper surface of the first separator member 11 is set greater than the height h2 of the rising wall section 12c from the bottom surface of the second separator member 12 as described above, whereby the folding section after caulking the rising wall sections 11c and 12c of the first and second separator members 11 and 12 extends from its center toward the radius direction by approximately the same length as shown in FIG. 7B.

Although the through-holes 11b and 12b are formed before forming the rising wall sections 11c and 12c to the first and second separator members 11 and 12 in the above-mentioned embodiment, it is not always necessary to form the through-holes 11b and 12b. It is enough to form slits to the first and second separator 10 members 11 and 12 with laser or the like before forming the rising wall sections 11c and 12c.

According to the above-mentioned embodiment, the first separator member 11 and the second separator member 12 are bonded to each other by caulking to thereby fabricate a metal separator for a fuel cell, resulting in facilitating the positional alignment between the first separator member 11 and the second separator member 12, and being capable of providing the metal separator 10 for a fuel cell having a short line tact, applicable to an assembly line and having good productivity. Further, the invention can provide the metal separator 10 for a fuel cell with reduced cost since it neither requires a binder or a brazing agent nor uses a bonding device or the like. Moreover, a separation, deviation, falling or the like at the bonding section does not occur even if the metal separator 10 for a fuel cell is exposed to high temperature or deformed by heat.

Additionally, the positional alignment between the first separator member 11 and the second separator member 12 is performed during the caulking process of the first separator member 11 and the second separator member 12 that is an intermediate process for fabricating the metal separator 10 for a fuel cell, thereby being capable of executing the positional alignment without providing a positioning process in particular. Further, the bonding sections 10k1 and 10k2 of the first and second separator members 11 and 12 are made to serve as the manifolds 10a1 and 10a2 of the metal separator 10 for a fuel cell, thereby being capable of executing the positional alignment without newly providing a section for the positional alignment.

Figure 9A:
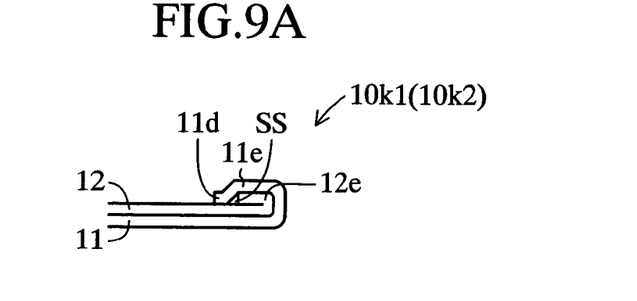
FIG. 9A is a view showing a first modified embodiment of a bonding section of the first separator member and the second separator member.

FIG. 9A to FIG. 9D show a modified embodiment of the above-mentioned bonding sections 10k1 and 10k2 for bonding the first separator member 11 and the second separator member 12. FIG. 9A shows the following one. Specifically, a folding section 11e of the first separator member 11 is set longer than a folding section 12e of the second separator member 12, whereupon the first and second separator members 11 and 12 are strongly and nippingly pressed in the vertical direction in the figure to thereby be caulked to each other. This establishes a state wherein the second separator member 12 is pressed by a leading edge 11d of the first separator member 11, so that the folding section 12e of the second separator member 12 is covered with the folding section 11e of the first separator member 11.

According to this configuration, a plastic deformation occurs by folding the leading edge 11d of the first separator member 11 to the extent that it presses the second separator member 12, whereby a spring back (which means that a section subject to a bending is tend to return to an original shape due to restoring force of a material) is difficult to occur. Further, an intimate contact between the leading edge 11d of the first separator member 11 and the second separator member 12 enhances sealability of the bonding sections 10k1 and 10k2, thereby being capable of preventing a leakage of gas from the manifolds 10a1 and 10a2. Additionally, applying a sealant into a space SS formed by the folding section 11e of the first separator member 11 and the second separator member 12 further enhances sealability of the bonding sections 10k1 and 10k2.

Figure 9B:
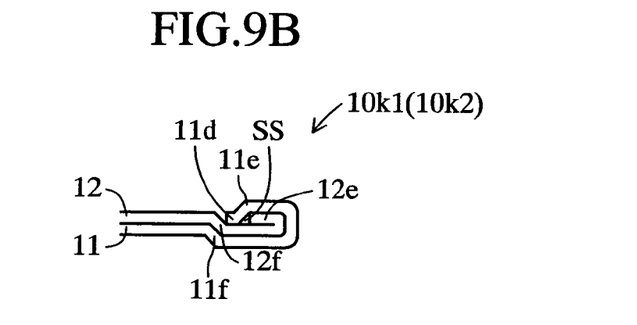
FIG. 9B is a view showing a second modified embodiment of a bonding section of the first separator member and the second separator member.

FIG. 9B shows the following one. Similar to the one shown in FIG. 9A, the folding section 11e of the first separator member 11 is set longer than the folding section 12e of the second separator member 12, whereupon the first and second separator members 11 and 12 are strongly and nippingly pressed in the vertical direction in the figure to thereby be caulked to each other. This establishes a state wherein the second separator member 12 is pressed by the leading edge 11d of the first separator member 11, so that the folding section 12e of the second separator member 12 is covered with the folding section 11e of the first separator member 11, and in addition to this, step sections 11f and 12f are respectively provided at the first separator member 11 and the second separator member 12.

According to this configuration, the second separator member 12 is pressed by the leading edge 11d of the first separator member 11, and further, the formation of the step sections 11f and 12f causes a plastic deformation on the second separator member 12 at the step section 12f of the second separator member 12 in particular to establish a firm and intimate contact between the leading edge 11d of the first separator member 11 and the second separator member 12, thereby further enhancing sealability of the bonding sections 10k1 and 10k2. Moreover, like the one shown in FIG. 9A, applying a sealant into the space SS formed by the folding section 11e of the first separator member 11 and the second separator member 12 further enhances sealability of the bonding sections 10k1 and 10k2.

Figure 9C:
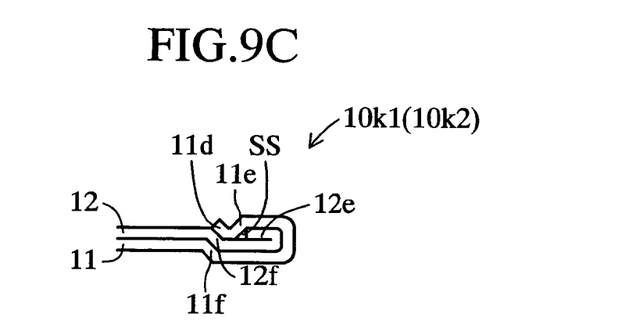
FIG. 9C is a view showing a third modified embodiment of a bonding section of the first separator member and the second separator member.

FIG. 9C shows a further modified embodiment of the bonding sections 10k1 and 10k2 shown in FIG. 9B. In this modified embodiment, the leading edge 11d of the first separator member 11 is further extended compared to the one shown in FIG. 9B and strongly and nippingly presses the second separator member 12 in the vertical direction in the figure, thereby forming the leading edge 11d of the first separator member 11 into a hollow shape matching to the shape of the step section 12f of the second separator member 12.

According to this configuration, the leading edge 11d of the first separator member 11 is plastic-deformed for establishing a firm and intimate contact to the step section 12d of the second separator member 12, thereby enhancing sealability of the bonding sections 10k1 and 10k2. Moreover, like the one shown in FIG. 9A, applying a sealant into the space SS formed by the folding section 11e of the first separator member 11 and the second separator member 12 further enhances sealability of the bonding sections 10k1 and 10k2.

Figure 9D:
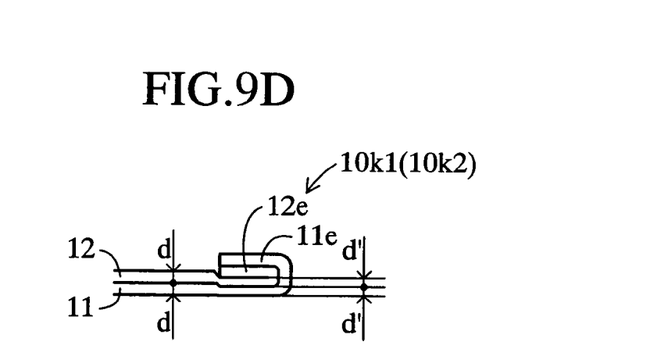
FIG. 9D is a view showing a fourth modified embodiment of a bonding section of the first separator member and the second separator member.

FIG. 9D shows the one wherein the first separator member 11 and the second separator member 12 are strongly and nippingly pressed in the vertical direction in the figure to establish a firm and intimate contact between the first separator member 11 and the second separator member 12, thereby further enhancing sealability of the bonding sections 10k1 and 10k2. In the one shown in FIG. 9D, the thickness d' of each of the first and second separator members 11 and 12 after the caulking is reduced compared to the original thickness d of each of the first and second separator members 11 and 12 by the enhancement in adhesiveness therebetween due to the strong nip-pressure.

Regardless of the above-mentioned modified embodiments, sealability of the bonding sections 10k1 and 10k2 after the caulking can further be enhanced by applying a sealant to a layered section of the first separator member 11 and the second separator member 12 upon laminating the first and second separator members 11 and 12. Further, the use of a material having a sealant coated in advance of the first separator member 11 and the second separator member 12 can further enhance sealability of the bonding sections 10k1 and 10k2 after the caulking, and in addition to this, can omit the labor for applying the sealant to the first and second separator members 11 and 12.

What is claimed is:

1. A metal separator for a fuel cell provided with;
a first separator member having a first rising wall section formed to be spaced apart from a formed section for introducing a gas by a predetermined distance, the first rising wall section performing a positional alignment; and
a second separator member having a second rising wall section formed to be spaced apart from a formed section for introducing a gas by the predetermined distance, the second rising wall section performing a positional alignment;
wherein the first rising wall section is fittingly inserted into the second rising wall section; and
the first rising wall section and the second rising wall section are folded to be caulked, thereby being bonded to each other.

2. A metal separator for a fuel cell claimed in claim 1, wherein a bonding section where the first separator member and the second separator member are bonded to each other serves as a manifold for passing a gas.

3. A metal separator for a fuel cell claimed in claim 1, wherein a bonding section where the first separator member and the second separator member are bonded to each other is configured such that a leading edge of the first rising wall section is brought into contact with the second separator member for covering a folding section of the second separator member with a folding section of the first separator member.

4. A metal separator for a fuel cell claimed in claim 3, wherein a sealant is incorporated into a space formed between the second separator member and the folding section of the first separator member.

5. A metal separator for a fuel cell claimed in claim 3, wherein a step section is provided at the bonding section of the first separator member and the second separator member.

6. A metal separator for a fuel cell claimed in claim 1, wherein, at the bonding section of the first separator member and the second separator member, a plate thickness of at least either one of the first separator member and the second separator member at the bonding section is decreased by a firm and intimate contact between the first separator member and the second separator member.

7. A bonding method of a metal separator for a fuel cell containing the steps of:
forming a first rising wall section of a first separator member to be spaced apart from a formed section for introducing a gas by a predetermined distance, the first rising wall section performing a positional alignment;

forming a second rising wall section of a second separator member to be spaced apart from a formed section for introducing a gas by the predetermined distance, the second rising wall section performing a positional alignment;

inserting the first rising wall section fittingly into the second rising wall section;

folding the first rising wall section and the second rising wall section; and caulking the first rising wall section.

8. A bonding method of a metal separator for a fuel cell claimed in claim 7, further containing the step of applying a sealant around the second rising wall section after the inserting step.

9. A bonding method of a metal separator for a fuel cell claimed in claim 7, containing the step of forming a step section at a bonding section of the first separator member and the second separator member.

10. A bonding method of a metal separator for a fuel cell claimed in claim 7, wherein a bonding section where the first separator member and the second separator member are bonded to each other serves as a manifold for passing a gas.

11. A bonding method of a metal separator for a fuel cell claimed in claim 7, wherein a bonding section where the first separator member and the second separator member are bonded to each other is configured such that a leading edge of the first rising wall section is brought into contact with the second separator member for covering a folding section of the second separator member with a folding section of the first separator member.

* * * * *